US008953350B2

(12) United States Patent
Kern

(10) Patent No.: US 8,953,350 B2
(45) Date of Patent: Feb. 10, 2015

(54) PHOTOVOLTAIC POWER CONVERTERS

(75) Inventor: Gregory Allen Kern, Redwood City, CA (US)

(73) Assignee: SunEdison, Inc., Maryland Heights, MO (US)

( * ) Notice: Subject to any disclaimer, the term of this patent is extended or adjusted under 35 U.S.C. 154(b) by 312 days.

(21) Appl. No.: 13/439,135

(22) Filed: Apr. 4, 2012

(65) Prior Publication Data

US 2013/0094261 A1 Apr. 18, 2013

Related U.S. Application Data

(60) Provisional application No. 61/516,816, filed on Apr. 8, 2011.

(51) Int. Cl.
*H02M 3/24* (2006.01)
*H02M 7/5387* (2007.01)
*H02J 3/38* (2006.01)
*H02M 7/48* (2006.01)
*H02M 1/00* (2006.01)

(52) U.S. Cl.
CPC .............. *H02M 7/5387* (2013.01); *H02J 3/383* (2013.01); *H02M 7/48* (2013.01); *H02M 2001/007* (2013.01); *Y02E 10/563* (2013.01)
USPC ............................................. 363/98; 363/132

(58) Field of Classification Search
CPC ........ H02M 7/48; H02M 7/5387; H02J 3/383
USPC .................................. 363/95, 97, 98, 131, 132
See application file for complete search history.

(56) References Cited

U.S. PATENT DOCUMENTS

| 7,031,176 | B2  | 4/2006  | Kotsopoulos et al. |
| 7,339,287 | B2  | 3/2008  | Jepsen et al. |
| 7,626,834 | B2  | 12/2009 | Chisenga et al. |
| 8,050,062 | B2* | 11/2011 | Wagoner et al. ................. 363/49 |
| 8,395,919 | B2* | 3/2013  | Schroeder et al. ............ 363/131 |

(Continued)

FOREIGN PATENT DOCUMENTS

GB          2434490 A       7/2007

OTHER PUBLICATIONS

Kotsopoulos, A. et al., Predictive DC Voltage Control of Single-Phase PV Inverters with Small DC Link Capacitance, Industrial Electronics, 2003 IEEE International Symposium on Jun. 9, 2003, pp. 793-797, IEEE vol. 2, Dept. of Electrical Engineering, Technical University of Eindhoven, The Netherlands.

(Continued)

*Primary Examiner* — Matthew Nguyen
(74) *Attorney, Agent, or Firm* — Armstrong Teasdale LLP

(57) ABSTRACT

Photovoltaic power converter systems and methods are described. In one example, a method for use in operating a solar power converter includes sampling a DC link voltage of a DC link during a first cycle of an alternating output voltage of a second stage at one instance when the alternating output voltage is crossing zero volts in a first direction. A voltage difference a voltage difference between the DC link voltage sampled during the first cycle and a DC link voltage sampled during a previous cycle when the alternating output voltage was crossing zero volts in the first direction is determined. A DC link power is estimated based at least in part on the determined voltage difference. The AC power output by the second stage in a second cycle is controlled based at least in part on the estimated DC link power.

25 Claims, 6 Drawing Sheets

(56) References Cited

U.S. PATENT DOCUMENTS

| | | |
|---|---|---|
| 2007/0017284 A1 | 1/2007 | Sadasivam |
| 2007/0133241 A1 | 6/2007 | Mumtaz et al. |
| 2009/0080226 A1 | 3/2009 | Fornage |
| 2010/0214808 A1 | 8/2010 | Rodriguez |
| 2013/0229842 A1* | 9/2013 | Garrity .......................... 363/95 |
| 2014/0097687 A1* | 4/2014 | Park et al. ...................... 307/43 |

OTHER PUBLICATIONS

International Search Report and Written Opinion of the International Searching Authority mailed on May 24, 2013 regarding PCT/US2012/032280 filed on Apr. 5, 2012, 16 pgs.

Esram, Trishan et al.; Comparison of Photovoltaic Array Maximum Power Point Tracking Techniques, Jun. 2007, IEEE Transactions on Energy Conversion, vol. 22, No. 2; 11 pages.

* cited by examiner

US 8,953,350 B2

PHOTOVOLTAIC POWER CONVERTERS

CROSS-REFERENCE TO RELATED APPLICATIONS

This application claims priority to U.S. Provisional Application No. 61/516,816 filed Apr. 8, 2011, the entire disclosure of which is hereby incorporated by reference in its entirety.

FIELD

This disclosure generally relates to power systems and, more specifically, to photovoltaic power converters.

BACKGROUND

In some known solar power systems, a plurality of photovoltaic (PV) panels (also known as solar panels) are logically or physically grouped together to form an array of solar panels. The solar panel array converts solar energy into electrical energy. The electrical energy may be used directly, converted for local use, and/or converted and transmitted to an electrical grid or another destination.

Solar panels generally output direct current (DC) electrical power. To properly couple such solar panels to an electrical grid, or otherwise provide alternating current (AC) power, the electrical power received from the solar panels is converted from DC to AC power. At least some known solar power systems use a single stage or a two-stage power converter to convert DC power to AC power. Some such systems are controlled by a control system to maximize the power received from the solar panels and to convert the received DC power into AC power that complies with utility grid requirements.

DC to AC converters typically need energy storage because the instantaneous input power is DC, and hence is constant when measured over periods of tens to thousands of milliseconds, whereas the output power is a time varying AC output. Energy storage is used to store energy when the AC output power is lower than the DC input power and to release energy when the AC output power is higher than the DC input power. Many known systems use electrolytic capacitors as a main energy storage element in DC to AC converter designs.

FIG. 6 is a graph (referred to as "10") that shows a DC energy input 12 and an AC energy output 14 from an energy storage element as a function of time for an ideal lossless DC to AC converter operating into a single phase AC power grid at 60 Hertz and rated at 250 Watts. As can be seen in graph 10, the difference between the two curves is a power ripple at twice the AC grid frequency, 120 hertz (Hz) ripple in 60 Hz AC power systems.

In some known DC/AC converters, energy storage electrolytic capacitors are placed at the input to the converter. The energy storage component does not have to be located at the input to the converter, but may instead be located somewhere in the middle of the power conversion process. For example, some DC/AC systems are designed to have a DC/DC conversion stage followed by DC link storage followed by a DC/AC output conversion stage. When electrolytic capacitors are used at the input of the DC/AC converter or in a DC link, they are typically sized to maintain a low ripple voltage, both at whatever switching frequency the inverter operates but also at the ripple frequency of twice the AC power frequency (e.g., 120 Hz in 60 Hz power systems).

Electrolytic capacitors are a relatively low cost approach to getting relatively large amounts of storage capacitance. However, electrolytic capacitors wear out relatively quickly, limiting their useful lifetime. Electrolytic capacitors are typically rated at 5,000 to 10,000 hours of full power operation. The typical wear out mechanism in electrolytic capacitors is the evaporation of the electrolyte in the capacitor, which causes internal resistance to increase and capacitance to decrease. Electrolytic capacitors also have relatively high internal resistance, potentially resulting in relatively high power losses and reduced efficiency of the converters in which they are included. Accordingly, a better solution is needed.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF SUMMARY

One aspect of the present disclosure is a method for use in operating a solar power converter. The converter includes a first stage for coupling to a photovoltaic module and outputting a direct current (DC) power, a second stage for coupling to an output of the first stage and outputting an alternating current (AC) power, and a DC link coupled between the first and second stage. The method includes sampling a DC link voltage of the DC link during a first cycle of an alternating output voltage of the second stage at one instance when the alternating output voltage is crossing zero volts in a first direction, determining a voltage difference between the DC link voltage sampled during the first cycle and a DC link voltage sampled during a previous cycle when the alternating output voltage was crossing zero volts in the first direction, estimating a DC link power based at least in part on the determined voltage difference, and controlling the AC power output by the second stage in a second cycle after the first cycle based at least in part on the estimated DC link power.

Another aspect of the present disclosure is a grid-tie solar power converter. The converter includes an input for receiving a direct current (DC) power input, a first stage for receiving the DC power input and including an output for providing a DC power output, a DC link coupled to the output of the first stage, a second stage coupled to the DC link and configured to convert DC power to an alternating current (AC) output power, and a controller coupled to the second stage. The controller is configured to sample a DC link voltage of the DC link during a first cycle of an alternating output voltage of the second stage at one instance when the alternating output voltage is crossing zero volts in a first direction, determine a voltage difference between the DC link voltage sampled during the first cycle and a DC link voltage sampled during a previous cycle when the alternating output voltage was crossing zero volts in the first direction, estimate a DC link power based at least in part on the determined voltage difference, and control the AC power output by the second stage in a second cycle after the first cycle based at least in part on the estimated DC link power.

Various refinements exist of the features noted in relation to the above-mentioned aspects. Further features may also be incorporated in the above-mentioned aspects as well. These refinements and additional features may exist individually or in any combination. For instance, various features discussed

BRIEF DESCRIPTION OF THE DRAWINGS

Like reference symbols in the various drawings indicate like elements.

DETAILED DESCRIPTION

The embodiments described herein generally relate to power systems. More specifically, the embodiments described herein relate to photovoltaic power converters for converting direct current (DC) input power to alternating current (AC) output power.

Figure 1:
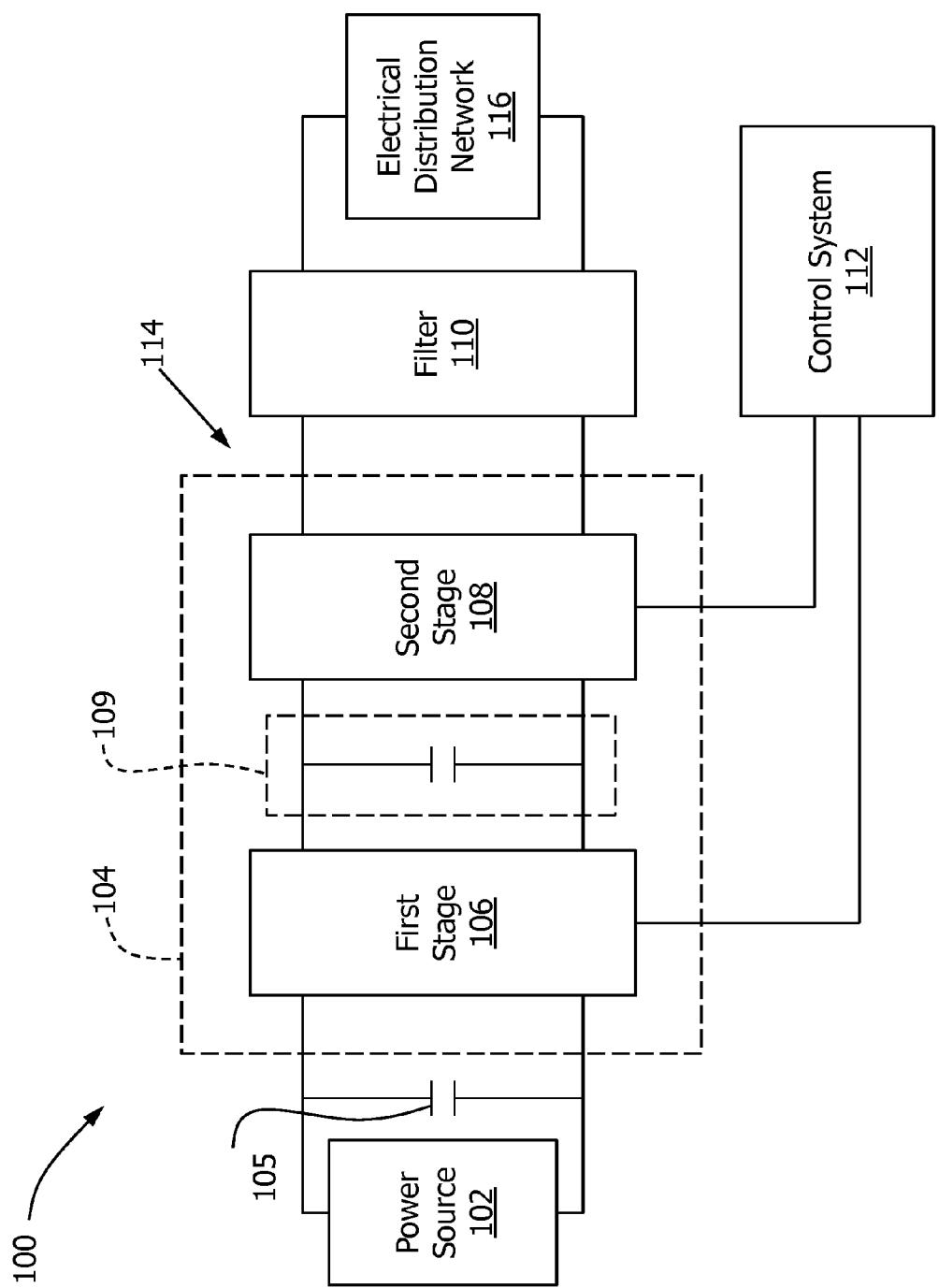
FIG. 1 is a schematic block diagram of an example power conversion system.

FIG. 1 is a schematic block diagram of an example power conversion system 100. A power source 102 is coupled to power conversion system 100 to supply electrical current to system 100. In an example embodiment, power source 102 is a photovoltaic, or "solar", array that includes at least one photovoltaic panel. Alternatively or additionally, power source 102 includes at least one fuel cell, a DC generator, and/or any other electric power source that enables power conversion system 100 to function as described herein.

In an example embodiment, power conversion system 100 includes a power converter 104 to convert DC power received from power source 102, via an input capacitor 105, to an AC output. In other embodiments, power converter 104 may output DC power. The example power converter 104 is a two stage power converter including a first stage 106 and a second stage 108. An energy storage component 109 is coupled between first stage 106 and second stage 108. In the example embodiment, energy storage component 109 is a non-electrolytic capacitor. More specifically, the example energy storage component 109 is a polypropylene film capacitor. In other embodiments, any other suitable non-electrolytic capacitor may be used. First stage 106 is a DC to DC power converter that receives a DC power input from power source 102 and outputs DC power to second stage 108 and energy storage component 109. When the output power of power converter 104 is less than the DC input power, excess energy is stored in energy storage component 109, which then supplies the stored energy to second stage 108 when the output power of power converter 104 is greater than the DC input power. Second stage 108 is a DC to AC power converter (sometimes referred to as an inverter) that converts DC power received from first stage 106 and/or energy storage component 109 to an AC power output. In other embodiments, power converter 104 may include more or fewer stages. More particularly, in some embodiments power converter 104 includes only second stage 108.

Power conversion system 100 also includes a filter 110, and a control system 112 that controls the operation of first stage 106 and second stage 108. Control system 112 may include an analog controller, a digital controller, or a combination of analog and digital controllers/components. In embodiments in which control system 112 includes a digital controller, control system 112 may include a processor, a computer, a memory device, etc. In such embodiments, the digital controller may be configured to function as described herein by, for example, appropriate instructions stored in a memory device. An output 114 of power converter 104 is coupled to filter 110. In the example embodiment, filter 110 is coupled to an electrical distribution network 116, such as a power grid of a utility company. Accordingly, power converter 104 may be referred to as a grid-tied inverter. In other embodiments, power converter 104 may be coupled to any other suitable load.

During operation, power source 102 generates a substantially direct current, and a DC voltage is generated across input capacitor 105. The DC voltage and current are supplied to power converter 104. In an example embodiment, control system 112 controls first stage 106 to convert the DC voltage and current to a substantially rectified DC voltage and current. Moreover, control system 112 operates first stage 104 to perform maximum power point tracking (MPPT) using any suitable MPPT technique. MPPT techniques are well known to those of ordinary skill in the art and will not be explained further herein. The DC voltage and current output by first stage 106 may have different characteristics than the DC voltage and current received by first stage 106. For example, the magnitude of the voltage and/or current may be different. Additionally, because first stage 106 is operated according to MPPT techniques, the magnitude of the characteristics (e.g., magnitude of the voltage, current, etc.) of the output of first stage 106 may vary over time.

In the example embodiment, first stage 106 is an isolated converter, which operates, among other things, to isolate power source 102 from the remainder of power conversion system 100 and electrical distribution network 116. More specifically, first stage 106 is an interleaved dual flyback converter. In other embodiments, first stage is a non-isolated converter and/or may have any other suitable DC/DC converter topology. The DC voltage and current output by first stage 106 are input to second stage 108, and control system 112 controls second stage 108 to produce AC voltage and current, and to adjust a frequency, a phase, an amplitude, and/or any other characteristic of the AC voltage and current to match the electrical distribution network 116 characteristics. The adjusted AC voltage and current are transmitted to filter 110 for removing one or more undesired characteristics from the AC voltage and current, such as undesired frequency components and/or undesired voltage ripples. The filtered AC voltage and current are then supplied to electrical distribution network 116.

Figure 2:
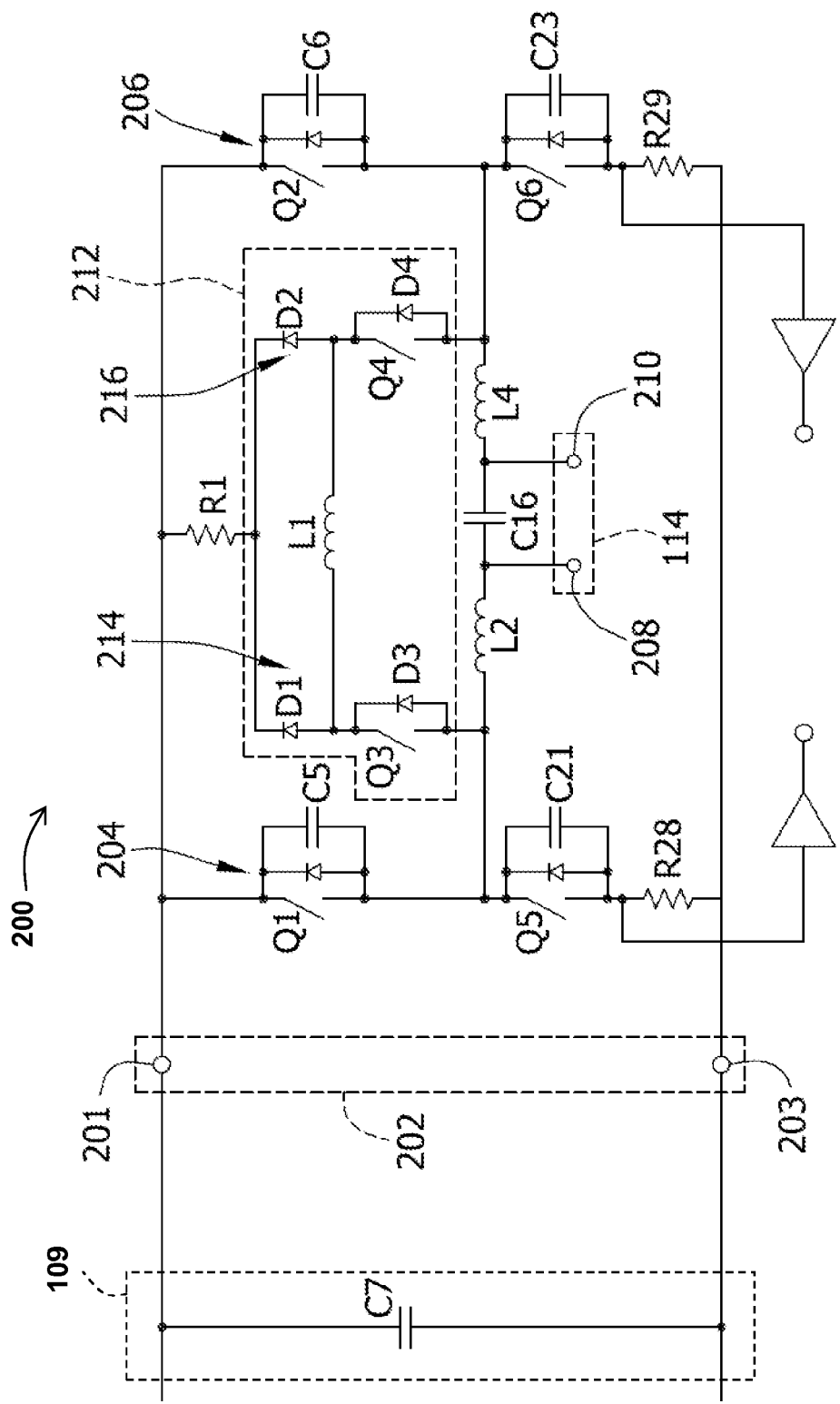
FIG. 2 is a schematic diagram of an example converter for use in the system shown in FIG. 1.

FIG. 2 is a schematic diagram of an example converter 200 for use as second stage 108. Converter 200 is a soft-switching H-bridge converter. Converter 200 is operable to output DC power or AC power. In the example embodiment, converter 200 is operated by control system 112 to output AC power to electrical distribution network 116. Generally, the peak output voltage of converter 200 must be less than the input voltage to converter 200. In one example embodiment, converter 200 is a 200 Watt, 120 Volt, 60 Hz grid-tie converter receiving an input of 200 to 400 Vdc. In another example embodiment, converter 200 is a 250 Watt, 120 Volt, 60 Hz grid-tie converter receiving an input of 200 to 400 Vdc.

Converter 200 includes an input 202 for receiving DC power. Input 202 includes a DC high node 201 and a DC low node 203. Energy storage component 109 is coupled to input 202. In the example embodiment, energy storage component includes capacitor C7. In one example embodiment, capacitor C7 comprises five metalized polypropylene film capacitors each rated at 5.6 uF 500 Vdc for a total capacitance of 28 uF. In another example embodiment, capacitor C7 comprises six metalized polypropylene film capacitors each rated at 4.7 uF 450 Vdc for a total capacitance of 28.2 uF.

An H-bridge is coupled and includes switches Q1, Q2, Q5, and Q6 and capacitors C5, C6, C21 and C23. These are the main power switches in the converter 200. Switches Q1 and Q5 form a first power branch 204 of the H-bridge, and switches Q2 and Q6 form a second power branch 206 of the H-bridge. In the example embodiment, switches Q1, Q2, Q5, and Q6 are metal oxide semiconductor field effect transistors (MOSFETs). Switches Q1, Q2, Q5, and Q6 are controlled so as not to rely on conduction of the body diodes in these switches. Diodes are useful, however, to clamp and protect switches Q1, Q2, Q5, and Q6 by clamping overvoltages to the DC input voltage. Under normal operation overvoltage spikes generally do not occur. If, however, converter 200 is forced by controller 112 to immediately shutdown while operating, switches Q1, Q2, Q5, and Q6 are turned off and diodes in parallel with switches Q1, Q2, Q5, and Q6 clamp the overvoltage spike that would otherwise occur. In the example embodiment, switches Q1, Q2, Q5, and Q6, which are MOSFETS, have a built in body diode so an external, or discrete, diode is not needed. In other embodiments, a separate, discrete diode may, additionally or alternatively, be coupled in parallel with each switch Q1, Q2, Q5, and Q6.

The H-bridge is generally operated as well understood by one of ordinary skill in the art. Opposing pairs of switches are alternately switched on and off to produce an AC output. More specifically, switches Q1 and Q6 are switched on and off together, while switches Q2 and Q5 are switched on and off together. When switches Q1 and Q6 are on, switches Q2 and Q5 are off, and vice versa. In the example embodiment, switches Q1, Q2, Q5, and Q6 are switched on and off during zero voltage conditions, i.e. zero voltage switching (ZVS), thereby substantially minimizing switching losses in switches Q1, Q2, Q5, and Q6.

The H-bridge is coupled to output 114. In the example embodiment, output 114 includes a first output node 208 and a second output node 210. A first output inductor L2 is coupled between the H-bridge and first output node 208. More specifically, first output inductor L2 is coupled between the first power branch 204 and first output node 208. A second output inductor L4 is coupled between the H-bridge and second output node 210. More specifically, second output inductor L4 is coupled between the second power branch 206 and second output node 210. First and second output inductors L2 and L4 are the main output filter inductors for converter 200. Separate inductors may reduce common mode electromagnetic emissions from the converter 200. In other embodiments, output inductors L2 and L4 may be replaced with a single inductor. In one example embodiment each output inductor L2 and L4 is rated at 1.3 mH and is made by winding 148 turns of number 20 AWG magnet wire on a magnetic core.

An output capacitor C16 is coupled across output 114. In the example embodiment, output capacitor C16 comprises two film capacitors connected in parallel. In one example embodiment, the two film capacitors are each 0.68 uF capacitors. In other embodiments, output capacitor C16 comprises a single capacitor. In one example embodiment, output capacitor C16 is a 0.47 uF capacitor rated for 310 Vac.

A soft switching circuit 212 is coupled to first output inductor L2 and second output inductor L4. Soft switching circuit 212 is configured to facilitate zero voltage switching of switches Q1, Q2, Q5, and Q6 of the H-bridge. Soft switching circuit 212 includes a first branch 214 having a first end coupled to first output inductor L2 and a second branch 216 having a first end coupled to second output inductor L4. The opposite, or second, end of first and second branches 214 and 216 are coupled together. First and second branches 214 and 216 are substantially identical.

Converter 200 includes four pulse capacitors C5, C6, C21, and C23 to facilitate soft switching of converter 200. Capacitors C5, C6, C21, and C23 are coupled across switches Q1, Q2, Q5, and Q6, respectively. The capacitance added by capacitors C5, C6, C21, and C23 slows down the rate of change of the voltages across switches Q1, Q2, Q5, and Q6 and thereby reduces the impact of small errors in control signal timing. In other embodiments, capacitors C5, C6, C21, and C23 are eliminated and the output capacitance of switches Q1, Q2, Q5, and Q6, without extra added capacitance, controls the soft switching characteristics of converter 200. In one example embodiment, capacitors C5, C6, C21, and C23 are 1000 pF, 2 kV rated pulse capacitors. In yet another embodiment, one capacitor may be used in place of the four capacitors C5, C6, C21 and C23 connected between L2 to L4 on the H-bridge side of L2 and L4.

Resistors R28 and R29 are current sense resistors. In the example embodiment, resistors R28 and R29 are 0.025 ohms, 1 watt, non-inductive resistors. Signals from resistors R28 and R29 are amplified by an amplifier circuit (not shown) and used by control system 112 as feedback for controlling the output current of converter 200. In the example embodiment, when switches Q1 and Q6 are on, the output current, of converter 200, flows through R29. If the output current is positive, then a positive voltage is developed across resistor R29 and this signal, after amplification, is used by control system 112 as feedback for control of positive output current. When switches Q2 and Q5 are on, the output current flows through resistor R28. If the output current is negative, then a positive voltage is developed across resistor R28 and this signal, after amplification, is used by control system 112 as feedback for control of negative output current. In other embodiments, positive and/or negative signals from both sense resistors are utilized as feedback by control system 112. The inclusion of current sense amplifiers and current sense resistors R28 and R29 may obviate the need for any current transformer in converter 200.

According to one aspect of this disclosure, a two stage photovoltaic power converter, such as converter 100, uses a relatively small capacitance capacitor as an energy storage component, such as energy storage component 109, between its two stages, and a relatively large ripple voltage is permitted on energy storage component 109. As discussed above, energy storage component 109 includes a non-electrolytic film capacitor. Film capacitors typically have a beneficial feature of being a "self-healing" design when subjected to overvoltage conditions. If a portion of a film capacitor fails, the failed portion is typically isolated from the rest of the capacitor and thus catastrophic failure is avoided. Film capacitors typically have a lower equivalent series resistance (ESR) than their electrolytic counterparts, and therefore can operate with higher relative amounts of voltage ripple without as much negative impact on reliability or efficiency.

The minimum amount of capacitance needed in energy storage component 109 depends upon several factors. The power rating of the converter 104 directly scales with the amount of storage capacity needed. The number of phases of power being produced also affects the energy storage capacity needed in energy storage component 109. A three phase converter 104 will typically need much less storage capacity than an equivalent power single phase converter 104 because instantaneous power delivery in a three phase system is much closer to that of DC power. The depth of modulation achievable by the second stage 108 also affects the amount of storage capacity required. Although some calculations herein assume an inverter design for second stage 108 wherein depth of modulation is ideal and can go from 0% to 100%, in real designs there are often limits on how high or low the duty cycle can go in second stage 108. Thus, practical designs for converter 104 generally will utilize an additional margin above the minimum capacitance calculated for an ideal inverter. The efficiency of second stage 108 may also have some small impact on how much storage capacity is required. As the efficiency of second stage 108 drops, a little more storage capacity is needed. Finally, the average voltage on energy storage component 109 relative to the AC output voltage affects the amount of storage capacitance needed in energy storage component 109. The minimum capacitance for energy storage component 109 should be chosen such that, during operation of converter 104, the instantaneous voltage on energy storage component 109 does not drop so low as to lose regulation of the output AC current or voltage.

Figure 3:
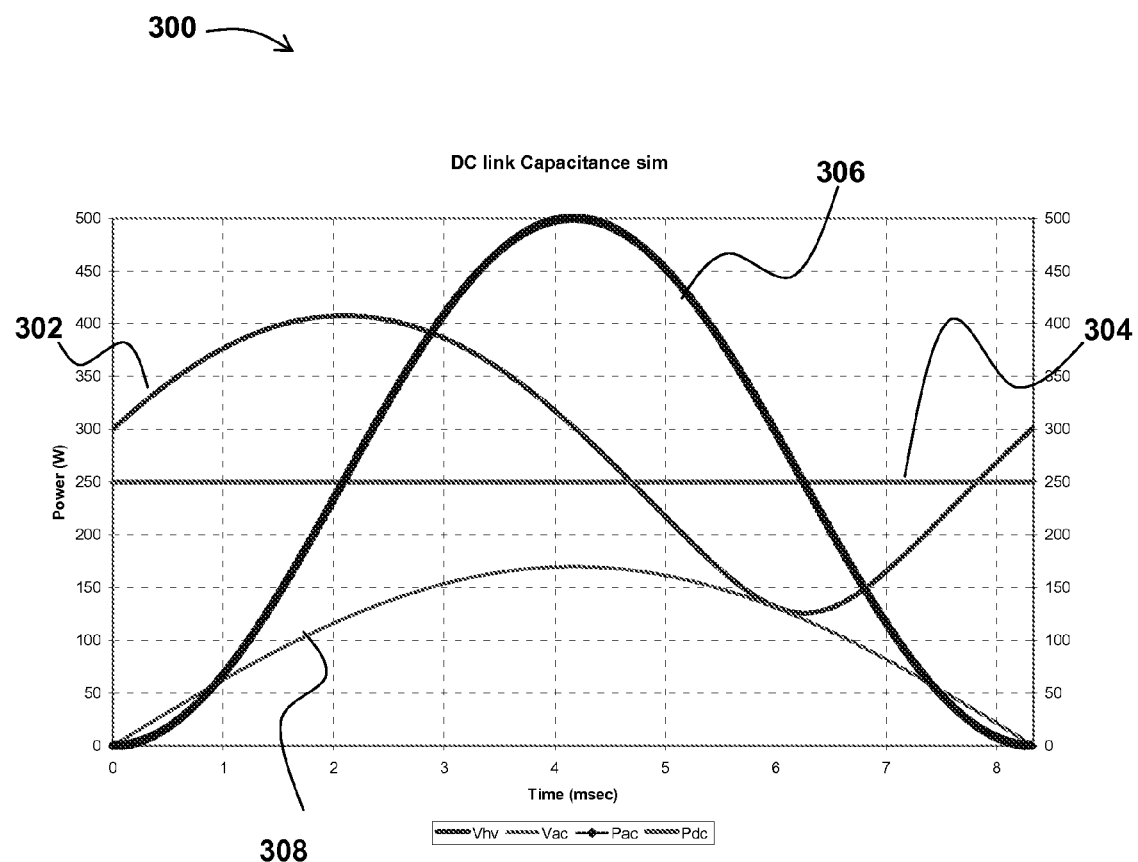
FIG. 3 is a graph showing the results of a simulation of an example converter.

FIG. 3 is a graph 300 showing the results of a simulation of an example converter 104 run to determine the minimum capacitance for energy storage component 109 that maintains proper output regulation. In this simulation, second stage 108 was a 250 Watt inverter based on converter 200 and the average voltage on energy storage component 109 was 300 volts. In the simulation, the capacitance of energy storage component 109 was 8.8 microfarads (uF).

Graph 300 shows one half of an AC cycle in time. A DC link voltage 302 (i.e., the voltage on energy storage component 109) starts and finishes at 300V. When a DC power 304 into the energy storage component 109 is greater than an AC power output 306 of second stage 108, DC link voltage 302 increases. Similarly, when DC power 304 into the energy storage component 109 is less than AC power output 306 of second stage 108, DC link voltage 302 decreases. DC link voltage 302 drops down to approximately equal the instantaneous AC voltage output 308 of second stage 108 at a time of about 6 milliseconds. Accordingly, an ideal second stage 108 may properly operate at 250 watt output with a 300 volt average voltage on energy storage component 109 with an 8.8 uF capacitor for energy storage component 109. A smaller capacitance in energy storage component 109 would result in a simulation showing DC link voltage 302 decreasing below AC voltage output 308. In such a converter 104, output regulation would be lost in an ideal inverter that can operate at 0 to 100% depth of modulation. A larger capacitance in energy storage component 109 would result in a simulation showing DC link voltage 302 never decreasing to equal AC voltage output 308. In such a converter 104, output regulation would be maintained, but the capacitance in energy storage component 109 may be more than is needed.

The minimum capacitance needed for energy storage component 109, however, varies based on the magnitude of the voltage applied to energy storage component 109 (e.g., the output voltage of first stage 106). Thus, the minimum capacitance for energy storage component 109 should be determined for voltages that may be applied to energy storage component 109 during operation of converter 104. More specifically, minimum capacitance should be determined covering the range of voltages that may be applied to energy storage component 109 when second stage 108 is being operated to output an AC power output. As is well known to those of ordinary skill in the art, inverters in photovoltaic systems are typically not operated to output an AC power output until their input voltage (e.g., the voltage on energy storage component 109) exceeds some threshold value. Simulations were performed for the example converter 104 as described above for energy storage component 109 voltages ranging from 200 volts to 300 volts. The results show a desired minimum capacitance ranging from about 30 uF for a 200 volt DC link voltage to about 8.8 uF for a 300 volt DC link voltage, when operating at full power.

As described above, as smaller capacitance is used in energy storage component 109, the voltage ripple appearing on energy storage component 109 increases. Such increased ripple voltage could result in a distorted output of converter 104. Controller 112, however, operates converter 104 in accordance with several aspects of the present disclosure to output a clean sine wave with relatively low total harmonic distortion (THD).

According to one aspect of the present disclosure, controller 112 sets the desired, or target, magnitude of the AC output current once per full AC cycle. An AC cycle is the cycle including the positive and negative excursions of an AC signal. For AC power output, the full AC cycle is the time during which the output increases from 0 volts to its peak value, decreases to its zero volts, decreases to its negative peak value (passing through zero volts, and increases back to zero volts. For a 60 Hz output, the full cycle last approximately 16.7 milliseconds. Of course, the selection of beginning and ending point of the cycle is arbitrary and the cycle may be considered as beginning at 0 volts and decreasing to its negative peak value, may be considered as beginning and ending at some non-zero value, etc. If the magnitude of the AC output current is set more often than once per cycle, the harmonic content of the output current waveform may increase. In particular, adjusting the output current at every zero crossing of the AC output may introduce even harmonics into the output current waveform. In other embodiments, controller 112 may set the magnitude of the AC output current more than once per full AC cycle. In other embodiments, controller 112 sets the target AC current less often than once per AC cycle.

As described above, first stage 104 controlled by controller 112 to regulate input voltage and perform maximum power tracking of the source 102. First stage 106 generally outputs whatever energy is available into energy storage component 109. This energy can fluctuate, but so long as it does not change too significantly from one AC cycle to the next, a clean sine wave output may be maintained by second stage 108. Controller 112, however, needs to know or at least approximate the DC input power to energy storage component 109 in order to operate second stage 108. In the example embodiment, DC input power into energy storage component 109 is estimated by controller 112. In other embodiments, the DC input power may be determined by other methods including, for example, direct measurement.

The DC input power to energy storage component 109 during an AC cycle (sometimes referred to as a first cycle) is estimated for use in determining the amount of AC power to output in the subsequent AC cycle (sometimes referred to as a second cycle). Controller determines how much magnitude of the voltage on energy storage component 109 changed during the first cycle. At one of the two zero crossings of the AC output voltage during a single AC cycle, the voltage on energy storage component 109 is measured by controller 112. The voltage is sampled at the same direction zero crossing in each AC cycle. For example, the voltage on energy storage component 109 may be measured at every increasing (i.e., having a positive slope) zero crossing of the AC output voltage. In other embodiments, the voltage on energy storage component 109 may be measured at every decreasing (i.e., having a negative slope) zero crossing of the AC output voltage. Moreover, in some embodiments, the voltage on energy storage component 109 is sampled in each cycle at both zero crossings of the AC output voltage. The change in energy storage component 109 voltage is calculated as the difference between the current measurement and the last measurement of the voltage on energy storage component 109.

When converter 104 is operating at steady state, the input power into the energy storage component 109 equals the output power from the energy storage component 109. If there is a mismatch in power, the energy storage component 109 voltage will either rise or fall depending upon the amount and direction of mismatch. The DC input power to energy storage component 109 is estimated by:

$$Pdc\_est = Pac + Vhv\_delta * Vhv * Chv * Fac \quad [1]$$

where Pac is the measured AC output power during the last cycle in Watts, Chv is the capacitance on energy storage component 109 in Farads, Vhv is the average energy storage component 109 voltage from the previous cycle of operation in Volts, and Fac is the AC grid frequency in Hz. As can be seen by inspection of equation 1, Vhv_delta=0, meaning the voltage on energy storage component 109 is not rising or falling, Vhv_delta=0, and Pdc_est=Pac. This is one of the goals for steady state operation. In non-steady state operation, however, the change in voltage on energy storage component 109 is not zero and Pdc_est will equal an amount other than Pac.

Figure 4:
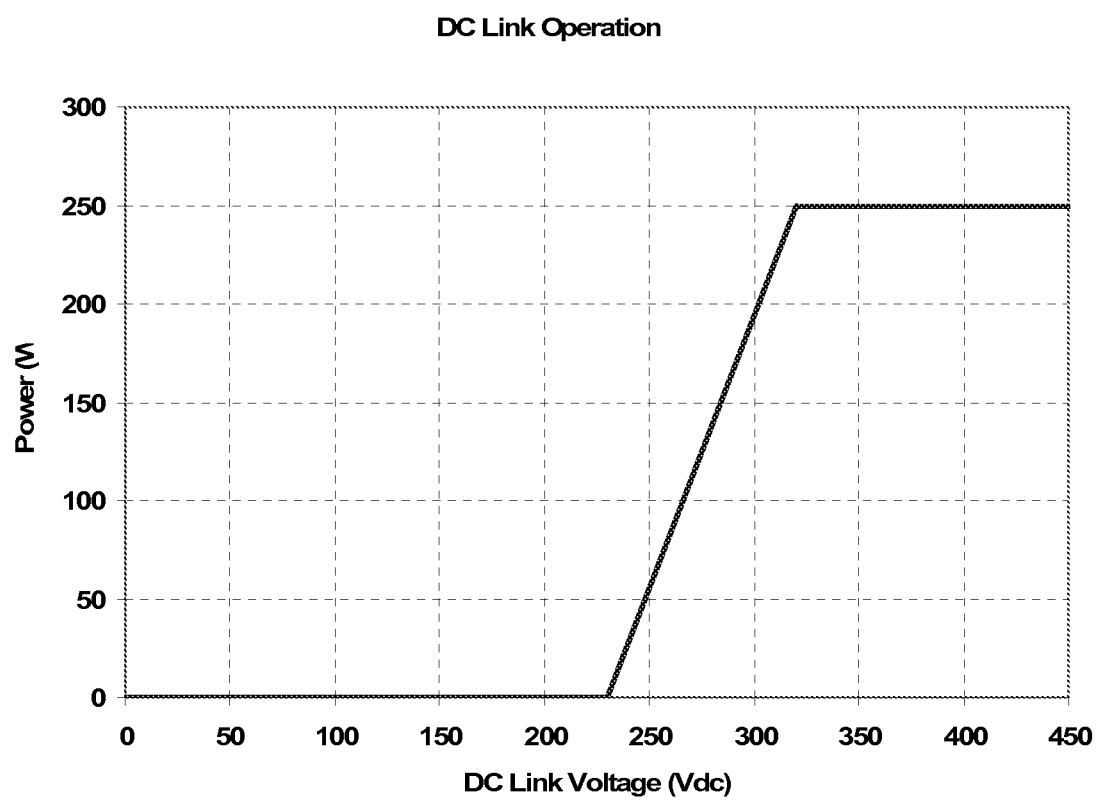
FIG. 4 is a graph of a desired power output of the converter shown in FIG. 2 as a function of DC link voltage.

A desired, or target, voltage on energy storage component 109 is next determined. The target voltage depends upon the DC input power level. In general, the voltage on energy storage component 109 should be low when the power level is low and should increase as the power level increases to facilitate stabilizing the voltage on energy storage component 109 and power operation. In the example embodiment, this relationship is described by a straight line curve as shown in FIG. 4. FIG. 4 shows a desired power output of second stage 108 as a function of the voltage on energy storage component 109. Second stage 108 does not operate to output AC power until the voltage on energy storage component 109 reaches 230 volts DC. The power output is linearly increased until the voltage on energy storage component 109 reaches 320 volts DC and power output is at a maximum of 250 watts. In other embodiments, different voltage values and power outputs may be used. Moreover, the target relationship between voltage on energy storage component 109 and power output of second stage 108 may have other, including non-linear, shapes in other embodiments.

In the example embodiment, if the estimated DC power input (i.e., Pdc_est) is less than 0, the target voltage on energy storage component 109 (referred to as Vhv_target) is 230 volts. If Pdc_est is greater than 250 W, Vhv_target is set to 320 volts. For all other values of Pdc_est, Vhv_target is set by:

$$Vhv\_target = 230 + (320-230) * (Pdc\_est/250) \quad [2]$$

Output power of second stage 108 is adjusted up or down by controller 112 as needed in order to control the voltage on energy storage component 109 according to the target voltage. In the example embodiment, controller sets a target AC power output according to:

$$Pac\_target = Pdc\_est + Khv * Chv * Vhv * Fac * (Vhv - Vh\-v\_target) \quad [3]$$

Where Vhv is the average voltage on energy storage component 109 from the previous cycle of operation, Vhv_target is the target voltage determined in equation 2, Khv is a proportional gain feedback constant (initially set to 0.5), Chv is the capacitance on the energy storage component 109, and Fac is the AC grid frequency in Hz.

Next the desired, or target, AC output current is determined. The desired output current amplitude, Iac_peak, is determined by:

$$Iac\_peak = Pac\_target * (\sqrt{2}) / Meas.Vgrid \quad [4]$$

Where Meas.Vgrid is the AC grid voltage measured from the previous cycle of operation, and Pac_target is the target AC output power determined in equation 3. In other embodiments, the measured AC grid voltage Meas.Vgrid may be replaced with the nominal grid voltage. Such embodiments may be used in particular when the AC grid voltage does not vary significantly. In other embodiments, Iac_peak may be determined from an Iac_target vs. energy storage component 109 voltage curve, such as by using a look-up table or equation.

Another aspect of the present disclosure is the use of feed forward compensation in the control of second stage 108. The control loop for second stage 108 is a fast control loop that executes once per switching frequency cycle. The switching frequency of second stage 108 in this example embodiment is nominally 48 kHz and second stage 108 is operated in continuous conduction mode at all power levels. Because the voltage on energy storage component 109 has a high amount of 120 Hz ripple (as described above), feed forward compensation facilitates minimizing the error term in the control loop for controlling the AC output current waveform. In the example embodiment, output voltage is related to input voltage and duty cycle as follows:

$$Vout = Vin * (2 * Duty - 1.0) \quad [5]$$

Where Vout is the instantaneous AC output voltage (v_ac), Vin is the voltage on energy storage component 109 (v_hv), and Duty is the duty cycle control of the H bridge mosfets. If Duty cycle is 50% (0.50) then Vout=0 volts. In an ideal DC/AC converter, Duty can vary from 0.0 to 1.0 (0 to 100%).

The desired duty cycle is calculated each time the control loop is executed based on the voltage on energy storage component 109 (v_hv) and the AC output voltage (v_ac). The calculation of feed forward duty cycle is independent of output current operating set point determined above. After solving for Duty and substituting in v_ac and v_hv for Vout and Vin, respectively, equation 5 becomes:

$$Duty = (v\_ac + v\_hv) / (2 * v\_hv) \quad [6]$$

In operation of the example embodiment, the feed forward control works as follows. Controller 112 determines a reference AC output current from a sine wave lookup table. An error between the measured output current of second stage 108 and the reference signal is calculated. Controller 112 calculates estimates of what v_ac and v_hv will be in the next switching cycle. The desired duty cycle for the next switching cycle is computed using the estimated next cycle values for v_ac and v_hv in place of the measured values and the result is multiplied by a proportional gain. Second stage 108 is then controlled by controller 112 based on the desired duty cycle determined using estimated next cycle values for AC output (v_ac) and the voltage on energy storage component 109 (v_hv).

Figure 5:
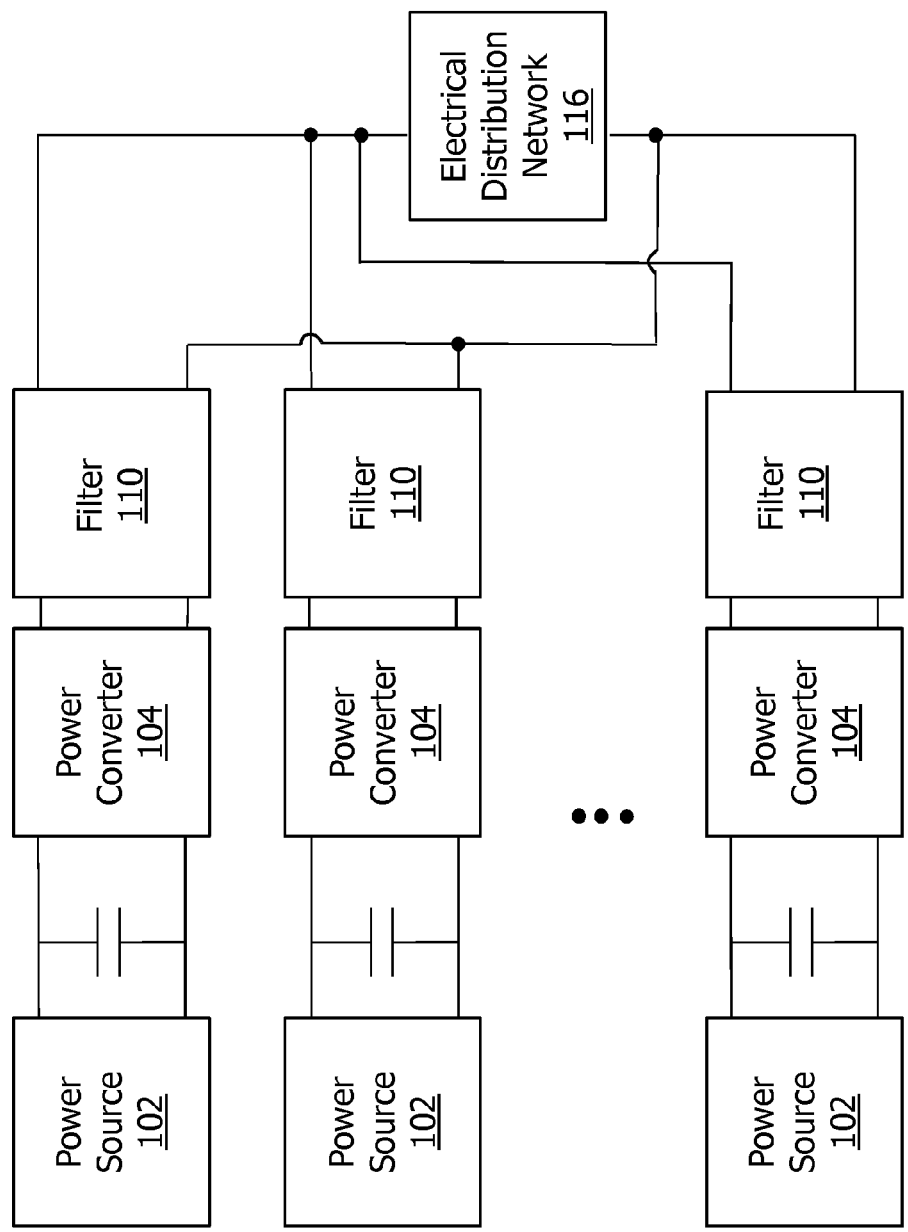
FIG. 5 is a schematic block diagram of an example installation including the power conversion system shown in FIG. 1.
Figure 6:
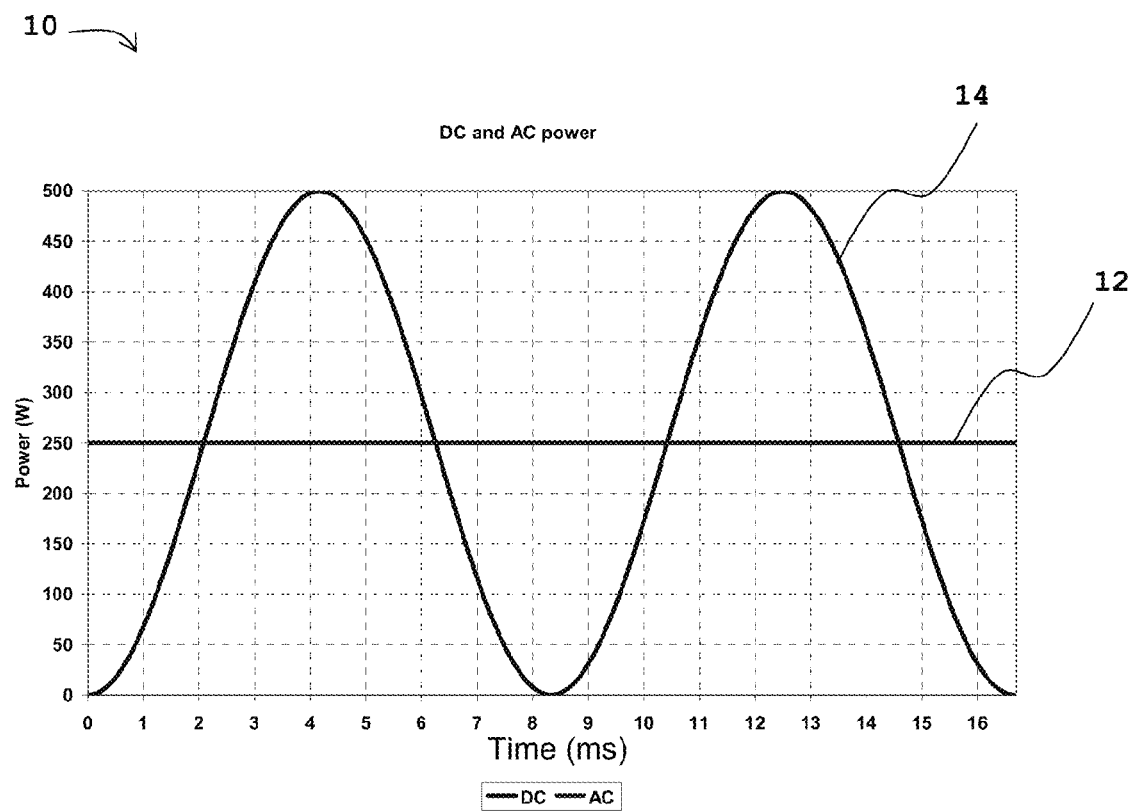
FIG. 6 (prior art) is a graph of a DC energy input and an AC energy output from an energy storage element as a function of time for an ideal lossless DC to AC converter.

The methods and systems described above function very well in steady state and slowly varying power conditions. During extreme transient conditions (e.g., when input power is dropping very fast) a few cycles of distorted AC output current may occur. FIG. 5 is a block diagram of an example installation of PV sources 102. The output of each PV source 102 is coupled to a separate converter 104 and output filter 110. The outputs of all filters 110 are coupled to AC electrical grid 116. Because each source 102 is coupled to a separate converter 104 and the outputs of all converters 104 are coupled to the same AC grid 116, the aggregation minimizes the affect of any distortions in the output of converters 104.

Power conversion systems as described herein may achieve superior results to known methods and systems. Power converters according to the present disclosure utilize non-electrolytic capacitors in a DC link between a DC/DC and a DC/AC converter. The non-electrolytic capacitors typically have a lower capacitance, but a longer life and lower ESR than electrolytic capacitors. Thus, systems and methods described herein may result in longer lasting and/or more efficient power converters. Moreover, lower capacitances are used in systems described herein allowing fewer capacitors to be used, thereby decreasing costs of producing the example converters. Accordingly, the methods and systems described in the present disclosure may result in lower cost, more efficient, and longer lasting power converters.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense.

What is claimed is:

1. A method for use in operating a solar power converter including a first stage for coupling to a photovoltaic module and outputting a direct current (DC) power, a second stage for coupling to an output of the first stage and outputting an alternating current (AC) power, and a DC link coupled between the first and second stage, said method comprising:
   sampling a DC link voltage of the DC link during a first cycle of an alternating output voltage of the second stage at one instance when the alternating output voltage is crossing zero volts in a first direction;
   determining a voltage difference between the DC link voltage sampled during the first cycle and a DC link voltage sampled during a previous cycle when the alternating output voltage was crossing zero volts in the first direction;
   estimating a DC link power based at least in part on the determined voltage difference, and
   determining a DC link voltage target as a function of the estimated DC link power; and
   controlling the AC power output by the second stage in a second cycle after the first cycle based at least in part on the estimated DC link power and the DC link voltage target.

2. A method in accordance with claim 1, wherein controlling the AC power output based at least in part on the estimated DC link power comprises determining a target AC power output of the second stage based at least in part on the estimated DC link power and the DC link voltage target.

3. A method in accordance with claim 2, further comprising determining an average DC link voltage for the first cycle.

4. A method in accordance with claim 1, wherein estimating the DC link power is further based on the average DC link voltage for the first cycle.

5. A method in accordance with claim 3, wherein determining the target AC power output comprises determining the target AC power output based at least in part on the estimated DC link power, the average DC link voltage, and a difference between the average DC link voltage and the DC link voltage target.

6. A method in accordance with claim 5, further comprising determining a target AC output current for the second stage based at least in part on the target AC power output, and wherein controlling the AC power output comprises controlling an AC output current of the second stage based at least in part on the target AC output current.

7. A method in accordance with claim 6, wherein the target AC output current is set only once per cycle.

8. A method in accordance with claim 1, wherein estimating DC link power is further based at least in part on a measured AC power output.

9. A method in accordance with claim 1, wherein controlling the AC power output comprises controlling an AC output current of the second stage.

10. A method in accordance with claim 9, wherein the converter is coupled to an AC grid and controlling the AC output current is based at least in part on a measured voltage of the grid in the first cycle.

11. A method in accordance with claim 9, wherein the converter is coupled to an AC grid and controlling the AC output current is based at least in part on a nominal voltage of the grid.

12. A method in accordance with claim 1, wherein the second stage comprises a DC high rail coupled to the DC link, a DC low rail coupled to the DC link, a first power branch and a second power branch coupled between the DC high rail and the DC low rail, the first power branch and the second power branch each comprising a resistive shunt, and wherein the method further comprises sampling signals from the first and second power branch's resistive shunts, and controlling operation of the second stage based, at least in part, on the sampled signals.

13. A grid-tie solar power converter comprising:
   an input for receiving a direct current (DC) power input;
   a first stage for receiving the DC power input and including an output for providing a DC power output;
   a DC link coupled to the output of the first stage;
   a second stage coupled to the DC link and configured to convert DC power to an alternating current (AC) output power;
   a controller coupled to the second stage, the controller configured to:
      sample a DC link voltage of the DC link during a first cycle of an alternating output voltage of the second stage at one instance when the alternating output voltage is crossing zero volts in a first direction;
      determine a voltage difference between the DC link voltage sampled during the first cycle and a DC link voltage sampled during a previous cycle when the alternating output voltage was crossing zero volts in the first direction;
      estimate a DC link power based at least in part on the determined voltage difference;
      determine a DC link voltage target as a function of the estimated DC link power; and control the AC power output by the second stage in a second cycle after the first cycle based at least in part on the estimated DC link power and the DC link voltage target.

14. A grid-tie solar power converter in accordance with claim 13, wherein the controller is configured to control the AC power output based at least in part on the estimated DC link power by determining a target AC power output of the second stage based at least in part on the estimated DC link power and the DC link voltage target.

15. A grid-tie solar power converter in accordance with claim 14, wherein the controller is further configured to determine an average DC link voltage for the first cycle.

16. A grid-tie solar power converter in accordance with claim 15, wherein the controller is configured to estimate the DC link power based at least in part on the average DC link voltage for the first cycle.

17. A grid-tie solar power converter in accordance with claim 15, wherein the controller is further configured to determine the target AC power output based at least in part on the estimated DC link power, the average DC link voltage, and a difference between the average DC link voltage and the DC link voltage target.

18. A grid-tie solar power converter in accordance with claim 17, wherein the controller is further configured to determine a target AC output current for the second stage based at least in part on the target AC power output, and control an AC output current of the second stage based at least in part on the target AC output current.

19. A grid-tie solar power converter in accordance with claim 18, wherein the controller is configured to set the target AC output current only once per cycle.

20. A grid-tie solar power converter in accordance with claim 13, wherein the DC link comprises a non-electrolytic capacitor.

21. A grid-tie solar power converter in accordance with claim 20, wherein the non-electrolytic capacitor comprises a film capacitor.

22. A grid-tie solar power converter in accordance with claim 21, wherein the second stage comprises a 250 watt, single phase, 120 volt AC inverter.

23. A grid-tie solar power converter in accordance with claim 22, wherein the film capacitor has a capacitance of less than about 30 microfarads.

24. A grid-tie solar power converter in accordance with claim 21, wherein the film capacitor comprises a plurality of film capacitors coupled to each other in parallel.

25. A grid-tie solar power converter in accordance with claim 13, wherein the second stage comprises a DC high rail coupled to the DC link, a DC low rail coupled to the DC link, a first power branch and a second power branch coupled between the DC high rail and the DC low rail, the first power branch and the second power branch each comprising a resistive shunt, and wherein the controller is further configured to sample signals from the first and second power branch's resistive shunts, and control operation of the second stage based, at least in part, on the sampled signals.

* * * * *